United States Patent [19]

Tavernier et al.

[11] Patent Number: 5,012,288
[45] Date of Patent: Apr. 30, 1991

[54] DRY TONER DEVELOPMENT

[75] Inventors: Serge M. Tavernier, Lint; Robert F. Janssens, Geel; Jan A. Zwijsen, Wilrijk, all of Belgium

[73] Assignee: AGFA-Gevaert, N.V., Mortsel, Belgium

[21] Appl. No.: 277,641

[22] Filed: Nov. 29, 1988

[30] Foreign Application Priority Data

Dec. 7, 1987 [EP] European Pat. Off. .......... 8702422.9

[51] Int. Cl.⁵ ............................................. G03G 15/06
[52] U.S. Cl. ..................................... 355/259; 355/305
[58] Field of Search ............... 355/251, 252, 253, 259, 355/261, 245, 305, 298; 118/653

[56] References Cited

U.S. PATENT DOCUMENTS

| 4,334,772 | 6/1982 | Suzuki | 355/251 |
| 4,383,497 | 5/1983 | Tajima | 355/261 X |
| 4,498,756 | 2/1985 | Hosoya et al. | 355/259 |
| 4,571,070 | 2/1986 | Tomita | 355/305 |
| 4,637,708 | 1/1987 | Yuasa | 355/245 X |
| 4,752,805 | 6/1988 | Fukae et al. | 355/298 |
| 4,777,904 | 10/1988 | Gundiach et al. | 355/259 X |

Primary Examiner—A. T. Grimley
Assistant Examiner—Sandra L. Hoffman
Attorney, Agent, or Firm—William J. Daniel

[57] ABSTRACT

Dry toner development of an electrostatic charge pattern on a recording surface is carried out with a dry toner layer formed on a donor member by electrostatic attraction resulting from a DC voltage applied across a gap between the surface of the donor member 22 and the surface of an upstream electrically conductive member 16 covered with a mixture of triboelectrically charged toner particles and magnetic carrier particles, the latter with adhering toner particles being attracted to the electrically conductive member surface by magnetic force and forming thereon a magnetic brush. The DC voltage in the gap causes selective attraction of the toner particles free of magnetic carrier particles and an AC voltage of lower peak magnitude can be superimposed on the DC voltage to set the particles in the gap in vibration and facilitate transfer across the gap. Application of the toner layer from the donor member surface to the recording surface is carried out without substantial relative movement between such surfaces.

20 Claims, 3 Drawing Sheets

DRY TONER DEVELOPMENT

The present invention relates to a method for the development of image-wise modulated electric field patterns or electrostatic charge patterns on a dielectric element.

A survey of different methods for the production of electrostatic charge images on photoconductive electrically insulating recording materials and on dielectric non-photoconductive recording materials is given e.g. in U.S. Pat. No. 4,130,670 and by A. D. Moore in the book "Electrostatics and its Applications"—John Wiley & Sons, New York—London, (1980).

In a special embodiment of electrostatic imaging, an electrostatic charge image is formed by the application of an image-wise modulated electric field to a non-photoconductive member while simultaneously thereon toner development takes place. Said embodiment is known under the name contrography and is described e.g. in the above mentioned book of A. D. Moore on pages 328–329 and exemplified in FIG. 7 of U.S. Pat. No. 4,637,708.

According to another special embodiment of electrostatic imaging, an electrostatic printing master is produced in a process known as xeroprinting in which a member having a permanent or persistent image or pattern of insulating material on a grounded conductive backing is charged, e.g. by corona discharge, to produce a latent image of electrostatic charges on the insulating areas. The electrostatic image is developed by toning with charged particles, and the toner image is transferred by electrostatic or other means to another surface such as paper or polymer film. Since the the original master contains a permanent or persistent conductivity image background associated with the insulating image areas, copies can be made with a single exposure by repeating the charging, toning and transfer steps. Xeroprinting operating with a photopolymer system is described in U.S. Pat. No. 4,732,831 and corresponding published EP-A No. 0 243 934 wherein reference is made to Research Disclosure, item number 15514, pages 9–10, March 1977 relating to "Electrostatic-washout imaging of photopolymerizable systems".

Development of an electrostatic charge pattern commonly occurs with toner particles that are attracted by coulomb forces to the charge pattern carried by the recording surface. In positive-positive development toner particles deposit on those areas of the charge carrying surface which are in positive-positive relation to the original image to be developed. In reversal development, toner particles migrate and deposit on recording surface areas which are in positive-negative relation to the original image. In such case in the initially conductive non-charged or discharged areas, induction forces acting through a properly biased development electrode create of opposite polarity to the toner charge and toner is deposited in these oppositely charged areas. (ref: R. M. Schaffert "Electrophotography"—The Focal Press—London New York, Enlarged and Revised Edition 1975, pp. 50–51, and T. P. Maclean "Electronic Imaging" Academic Press—London, 1979, p. 231).

The toner particles are normally triboelectrically charged by contact with another material usually in the form of carrier particles which material in the triboelectric series is sufficiently separated from the material of the toner. A triboelectric series serving as a guide in the selection of toner material is given in the periodical "Physics Today"/May 1986, p. 51.

On a microscopic scale, the polarity and magnitude of the toner charge is determined by the triboelectric relationship between the toner and the carrier-particle surface composition. Mechanical agitation occurring in preparing that mixture and during the development process ensures the necessary charging of the toner particles.

A survey of different techniques used in the development of electrostatic charge patterns is given in IEEE Transactions on Electron Devices, Vol. ED-19, No. 4, April 1972 by Thomas L. Thourson under the title "Xerographic Development Processes": A Review. According to this source the principal dry development techniques are defined as: A. Cascade development, B. Magnetic brush development, both of which operate with a carrier-toner mixture, and C. Single component dry development, of which touchdown development is a special embodiment.

Magnetic brush development operating with electrically conductive magnetic carrier particles permits a better development of solid image area than cascade development and is one of the most common development techniques used in commercial copiers. During development a magnetic brush formed by toner laden magnetic carrier particles following magnetic field lines, e.g. of magnets in a non-magnetic rotating sleeve, is moved through the development zone whereby triboelectrically charged toner particles are transferred from the magnetically retained carrier particles onto the electrostatic charge pattern on the recording element. The contact of the recording element carrying the charge image with the brush filaments of carrier particle "strings" or aggregates loaded with toner particles is necessary to achieve at sufficient toner deposition in charged image areas that exhibit only a relatively weak coulomb attraction. However, this contact of said brush-like filaments formed by strings of carrier particles covered with triboelectrically attracted toner particles has the disadvantage of spoiling high resolution work and destroying the finer screen dots in halftone work, e.g. obtained with xeroprinting as defined already hereinbefore. Brush marks are produced that interfere with fine image details.

The use of a development member carrying a layer of toner powder for touchdown development of electrostatic charge patterns on a photoconductive recording member is described e.g. in U.S. Pat. No. 2,895,847 wherein the toner application proceeds e.g. with a camel's hair brush or the like. In the direct contact of the development member with such hair brush the formation of brush marks cannot be avoided.

In touchdown development systems, a surface (the donor) bearing a layer of charged toner particles is brought in actual physical contact with the material carrying the charge pattern and then removed, resulting in the transfer of toner from the donor to the charged surface areas. In a preferred embodiment of touchdown development there is no relative motion between the charge carrying element and the donor during development which makes high resolution work possible without developer streaks. An advantage of touchdown development is in consistency of the results. Each area of the latent charge image experiences exactly the same development situation.

Touchdown development offers a good solid area development because the donor member acts as a development electrode forming a close-spaced electrode system with the charge pattern. The effect of a development electrode is to change the field configuration at the site of development in such a way that field lines emanate in the space above large solid picture areas and are not confined just to along the edges. Under these conditions, the various regions of an electrostatic image will be developed-out more nearly in proportion to the electrical charge density distributed more equally over a large charged zone.

The main problem associated with touchdown development is that toner particles with only low triboelectric charge are obtained since touchdown development is inherently limited to a single component namely toner particles in the absence of carrier particles. With no carrier particles the toner particles must acquire their triboelectric charge by frictional contact with the walls of the developer container, doctor blades and/or toner donor element. Such frictional contact is much weaker than that which occurs in conjunction with carrier particles so that single component touchdown development in comparison with carrier-toner development will result in with with toner particles having a considerably smaller charge-to-mass ratio.

When frictional contact is poor appreciable amounts of toner particles may have zero charge or even a charge sign opposite to that required. As a result, a relatively heavy deposition of toner in background areas takes place. Moreover, since properly charged toner particles in mono-component developers have a lower charge than those applied in two-component (carrier-toner) development using a magnetic brush, the toner particles in mono-component developers have insufficient interparticle repellence and hence tend to become deposited as a agglomerate which impairs image resolution. Further, the relatively weakly charged toner particles of mono-component developers require stronger electric imaging fields for obtaining ultimate toner images of sufficient optical density. In other words, compared with two-component development they yield for a same charge a lower optical density.

To overcome the troublesome tendency in touchdown development for the toner particles to become charged to a polarity and thus opposite to the desired polarity interfere with the development of the charged image, it has been proposed in U.S. Pat. No. 4,637,708 to transport first magnetically attractable toner particles on a movable endless conveyor belt that is properly voltage biased before transferring the same from said belt onto the recording element. The voltage biasing of the conveyor belt with respect to an upstream rotating, magnetic applicator sleeve prevents toner particles of undesired charge polarity from moving from the sleeve towards the belt so that only the properly charged toner particles are allowed to reach the recording element.

According to the claimed touch down development embodiment a multi-stylus head which has a number of electrodes in the form of styli abut against the back of the belt which is opposite to the recording surface and voltage pulses associated with image data are applied to the styli which thus form an image-wise modulated electric field between the belt and the recording medium whereby toner particles are attracted onto a dielectric recording medium, e.g. plain paper.

The application of the voltage bias between said sleeve and the transport belt prevents any toner particles having an undesired charge polarity from being transferred to the belt the latter being instead returned to the hopper. In such development the amount of toner adhering to the belt increases with the intensity of the electric field applied between the belt and the rotating sleeve of the magnetic applicator (see curve in FIG. 5 in said U.S. Pat. No. 4,637,708). From that curve one observes that the amount of toner deposit on the belt reaches saturation as the intensity of the electric field increases beyond a certain value. In the saturation range the toner can be transferred evenly from the sleeve to the belt although the thickness of the toner layer on the belt may be somewhat uneven.

The use in said development technique of a single component toner developer means that the charge-to-mass ratio of the toner as particles cannot be as high as can be obtained in two-component carrier-toner development are so that electrostatic charge images of low charge potential or continuous tone cannot actually be developed.

It is an object of the present invention to provide a method for the development of electrostatic charge patterns combining the advantages associated with the use of touch down development and with the use of toner particles having high charge to mass ratio and single charge sign. These advantages include high optical density and good solid area development combined with clean image background without development brush streaks.

Other objects and advantages of the present invention will appear from the further description and drawings.

In accordance with the present invention an image recording method is provided wherein with the aid of an image-wise modulated electric field or image-wise modulated electrostatic charge image a toner image is formed on a recording element from dry toner particles of a single polarity applied in the form of a toner layer on the surface of an advancing donor member which toner layer is brought in touchdown contact with said element for image-wise transfer thereto of said toner particles, said toner layer having been formed on said donor member by electrostatic attraction resulting from a direct current (DC) voltage (DC electric field) applied between the surface of said donor member and the surface of an upstream electrically conductive member carrying a layer of a mixture of triboelectrically charged toner particles and magnetic carrier particles, said carrier particles being attracted to said electrically conductive member by magnetic force to form on said conductive member a magnetic brush of magnetic carrier particles carrying electrostatically adhering toner particles, and wherein the donor member is operatively advanced with respect to the recording element to be toner developed in such a way that during development there is no substantial relative movement between them in the development zone.

According to a preferred embodiment the electrical field between the facing surfaces of said donor member and conductive member created by said DC voltage is sufficiently strong to obtain saturation of toner particles, i.e. the electrical field yields complete overall loading of the donor member with toner particles. The electric field strength depends on the composition of the carrier-toner mixture and the width of the gap forming the development zone between the donor member and the conductive member. The conductive member is e.g. a rotating sleeve having one or more optionally rotating magnets inside.

A suitable biasing DC voltage for saturation-coverage of the donor member with toner particles is e.g. in the range of 300 to 1000 V. For said biasing a direct current voltage source having the desired polarity for detaching the toner particles from their carrier particles is used.

According to a special embodiment the donor member and the magnetic brush are spatially arranged in such a way that there is a small interspace, a so-called air gap, between them and the electric field is sufficiently strong to have cause an overall "jump over" of toner particles onto the donor member from the magnetic brush filaments consisting of magnetic carrier particles covered with triboelectrically charged non-magnetic toner particles. The width of the air gap between the magnetic brush member surface and toner donor member surface is e.g., in the range of 0.1 to 2.0 mm, preferably in the range of 0.1 to 0.5 mm, and the electric field corresponds e.g. to a DC voltage difference of 600 to 2000 V.

According to a further embodiment the DC voltage is combined with an AC voltage of a lower peak value than the DC voltage level such in order to bring the toner mass in the transfer gap into a state of vibration and to promote the jump-over of toner particles from the magnetic brush onto the donor member.

For an effective application of the electric field the donor member surface has preferably a surface resistivity not higher than $10^{13}$ ohm/square and said conductive member, e.g. the already mentioned rotating sleeve having one or more optionally rotating magnets inside, preferably has at least its surface layer directed towards the donor member made of a material having a specific resistance lower than $10^2$ ohm.cm.

In a preferred embodiment said sleeve is made of aluminium having a specific resistivity lower than $10^{-5}$ ohm.cm and is penetratable by magnetic field lines.

The material of the magnetic carrier particles whereto the toner particles adhere by triboelectric attraction has preferably a relatively high specific resistance (preferably higher than $10^{12}$ ohm.cm), and hence avoid an electric short-circuiting between the magnetic brush and donor member and consequently maintain a high electric field gradient over the gap.

For high quality development the toner layer on the donor member has preferably a thickness not surpassing 50 micron and the toner layer thickness defines actually the gap across which touchdown contact and development take place. So, there is no jump-over of individual toner particles in the touchdown contact stage of the process according to the present invention, but agglomerates of toner particles corresponding with solid toner particle layer portions are transferred.

Toner particles used in the present method need not be magnetically attractable. The use of non-magnetic toner particles has the advantage that no magnetic material is present to interfere in color with the colouring substance used in the toner mass. In colour toners such interference is strongly undesirable since magnetic material such as iron oxides and ferrites are black or have at least a dark color spoiling color brilliance.

The donor member has preferably the form of a rotating endless belt or a rotating drum and should preferably have at least a surface layer of a material that undergoes triboelectrically charging with a charge of opposite charge sign with respect to the toner particles. A triboelectric series serving as a guide in the choice of said material is given in the periodical Physics Today, May 1986, p. 51.

In a preferred embodiment of the present invention the movement of the donor member is operatively related with the recording element to be toner developed in such a way that during development there is no substantial relative movement between them in the recording development zone.

The element to be toner-developed may be a dielectric element for forming thereon an electrostatic charge pattern according to any known electrographic technique wherein electrostatic charge carriers are applied image-wise onto a dielectric element or may be a photoconductive dielectric element for forming thereon an electrostatic charge pattern according to the principles of electrophotography. Said element may be made in the form of a belt or drum.

According to the special electrographic process known as contrography (see the already mentioned book of A. D. Moore, p. 328-329) a charge image is created with an image-wise modulated electric field using electrode styli and is simultaneously toner developed. The recording material used in said embodiment is preferably a dielectric coated paper as described e.g. by R. M. Schaffert in the book "Electrophotography'-'—The Focal Press—London and New York, 2nd revised edition, (1975), p. 207.

According to another special electrostatic imaging process known as xeroprinting described in U.S. Pat. No. 4,732,831 and corresponding published EP-A No. 0 243 934, a photopolymer master is imagewise exposed and imagewise charged in the exposed areas, after which these areas are toner developed and the resultant toner image is transferred to another surface. The steps of toning and transferring are repeated to produce multiple copies with a single exposure. The master is made from a combination of polymeric binders, ethylenically unsaturated monomers, HABI initiators and chain transfer agents. The HABI polymerization initiators are biimidazoles, also called 2,4,5 triarylimidazolyl dimers, according to the general formula disclosed in said U.S. Pat. Nos. and EP-A documents.

In the described and claimed xeroprinting process toner development is carried out preferably with a suspension toner (liquid electrophoretic toner composition) obviously to avoid the inferior reproduction quality resulting from common dry toner development systems when they are applied in the reproduction of graphic art originals, especially halftone images comprising tiny screen dots that need to be reproduced as sharp as possible. The dry toner development process according to the present invention achieves a development quality suitable for graphic art reproduction without loss of fine image details such as fine screen dots.

In a preferred embodiment the recording element to be toner developed and the donor member are in the form of drums that rotated in the opposite sense and at the same circumferential speed. The recording element to be toner developed and the donor member are arranged in such close proximity that touchdown development can be carried out.

According to another embodiment the toner donor member is in the form of an endless belt operated with driving and tensioning rollers to apply the toner layer by touchdown onto the recording element to be toner developed.

The general nature of the invention having been set forth, there will now be given a more detailed description illustrated by accompanying drawings.

Figure 3:
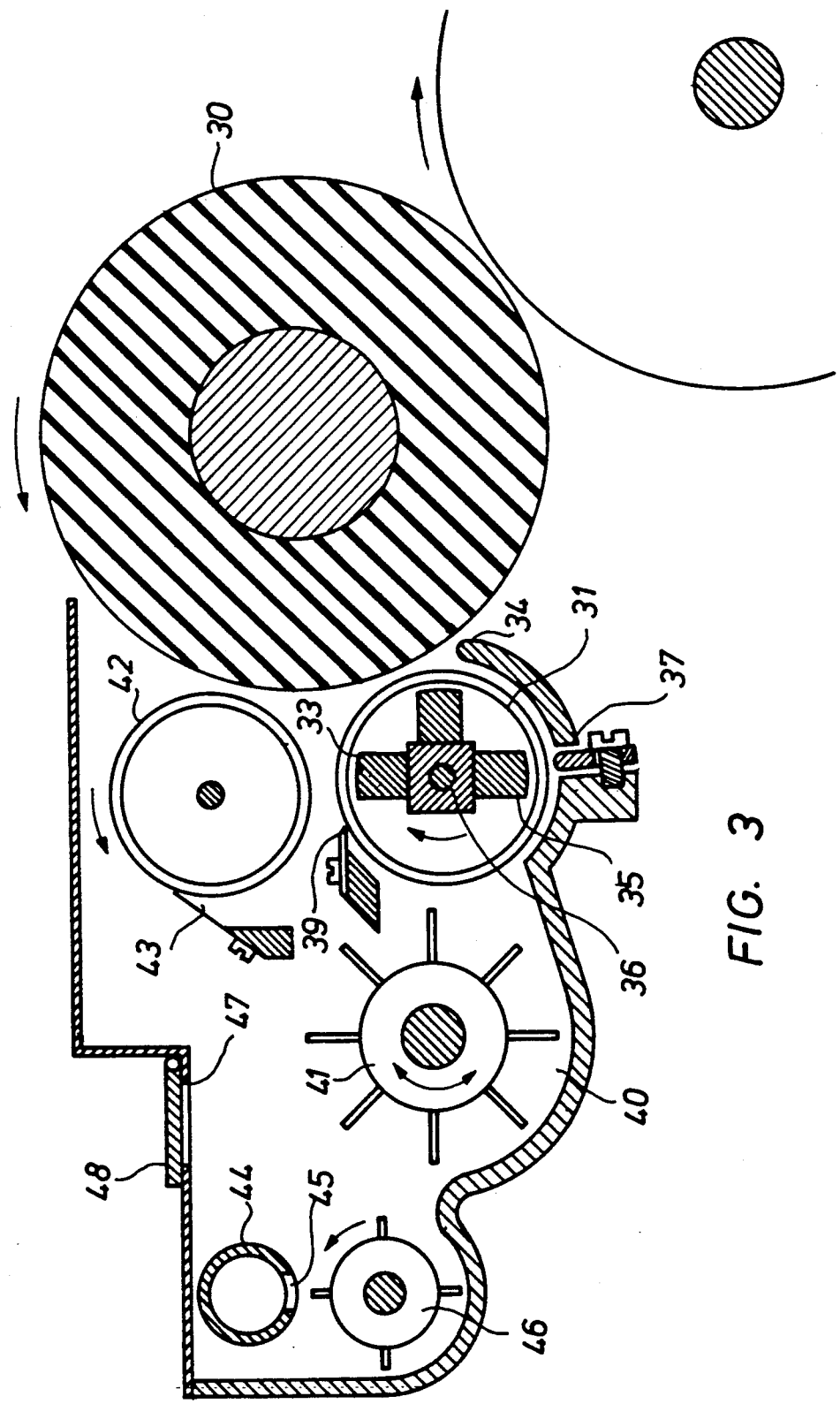

FIG. 3 represents a diagrammatic cross-sectional view of an automatic, copying apparatus wherein in addition to a first conductive member incorporating magnets for forming a magnetic brush supplying toner to the donor member a further conductive member is used by means of which residual toner after touchdown development is picked up by electric force and said toner is re-mixed with carrier particles.

Figure 4:
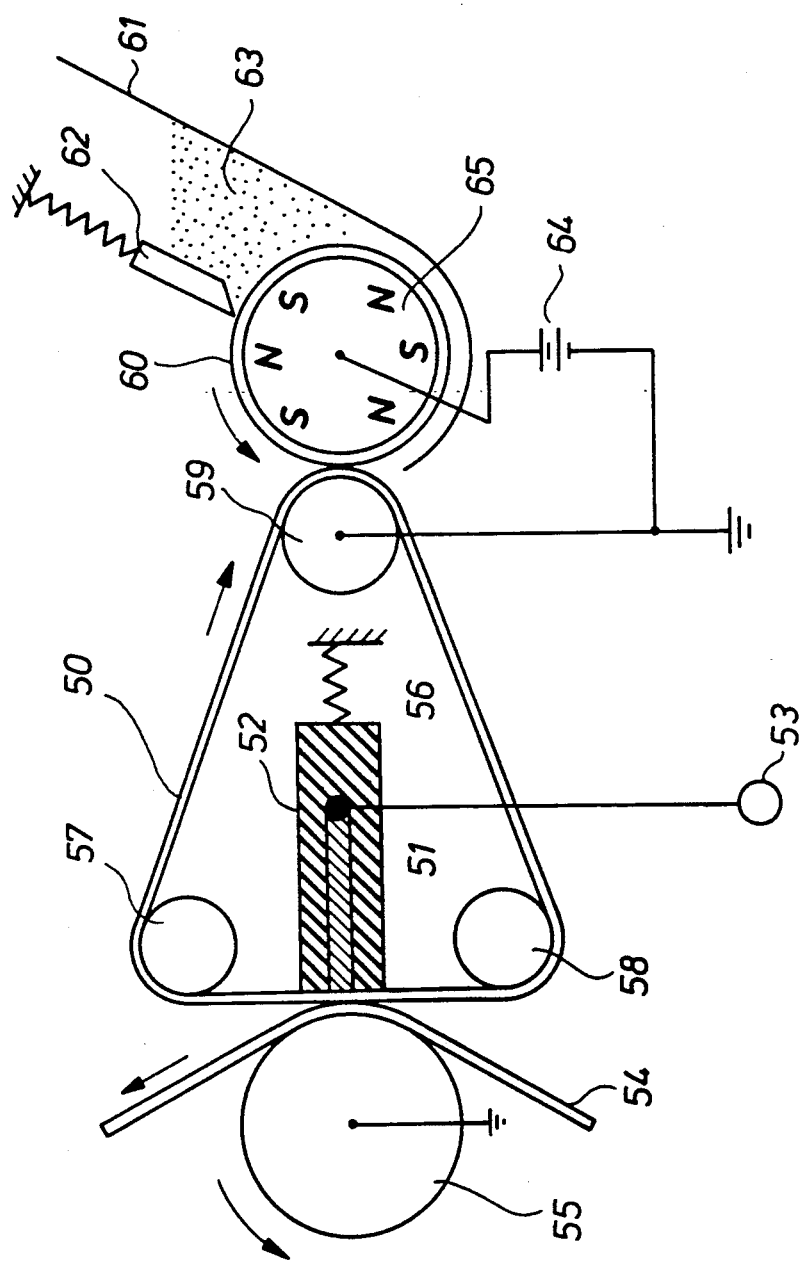

FIG. 4 represents a diagrammatic cross-sectional view of an automatic electronic imaging apparatus operating according to the present invention with a magnetic brush configuration arranged in conjunction with a toner donor member for touchdown development of a dielectric coated paper by electrostatic image formation through image-wise modulated electric field formation of a charge pattern development proceed simultaneously.

Figure 1:
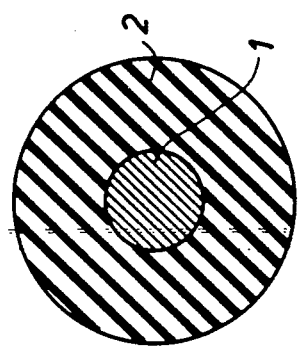
FIG. 1 represents a diagrammatic cross section of a cylindrical toner donor member suited for use in the present invention.

In FIG. 1 representing a toner donor member suited for use according to the present invention, element 1 is a conductive metal shaft on which a thick sleeve 2 of conductive rubber (specific resistivity lower than $10^5$ ohm.cm) is mounted. The rubber may be resilient and deformable whereby on exerting some pressure on the conductive rubber sleeve in touchdown development a larger contact area and development zone can be obtained.

The rubber cylinder operating as donor member has e.g. a diameter in the range of 5 to 20 cm. The surface resistivity is e.g. about $10^6$ ohm/square.

Figure 2:
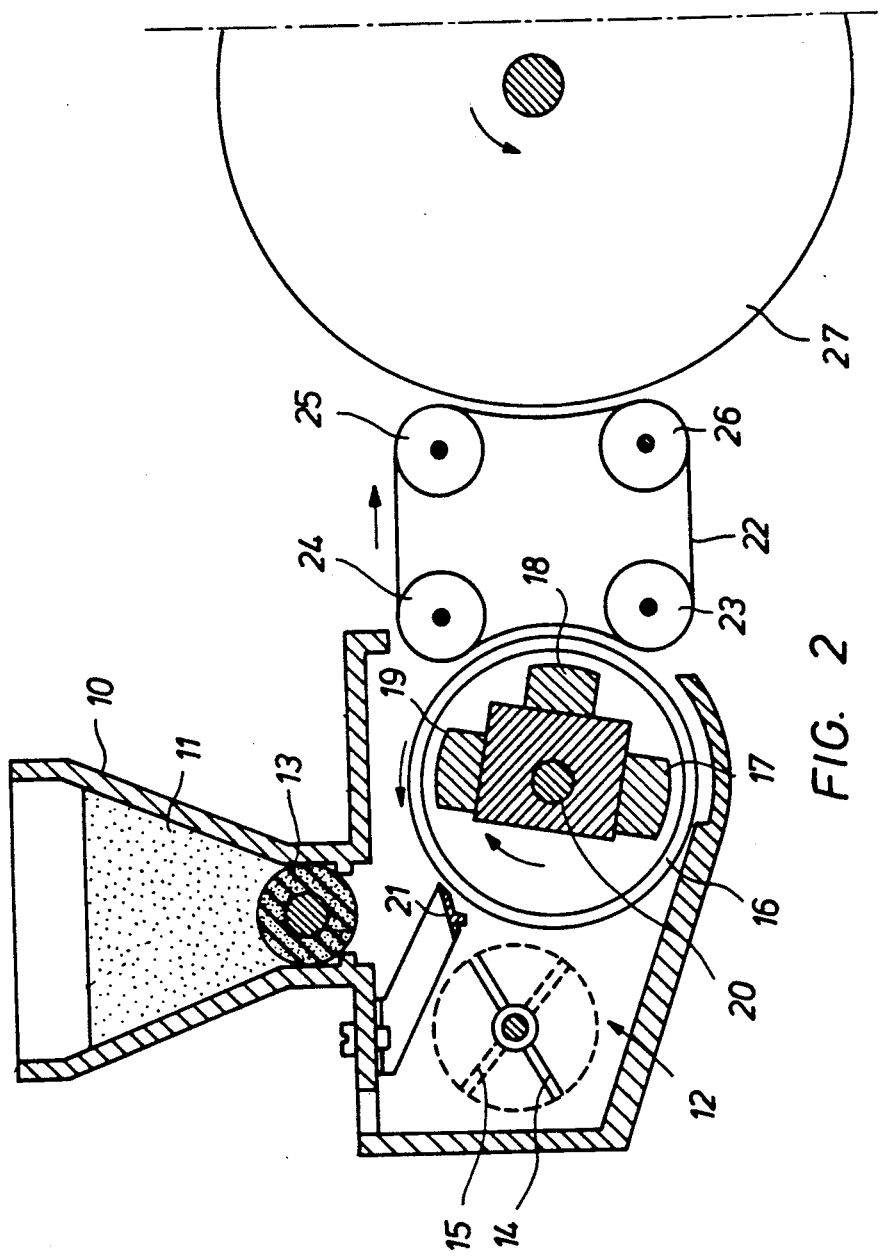
FIG. 2 represents a diagrammatic cross-sectional view of an automatic copying apparatus operating according to the present invention with a magnetic brush configuration arranged in conjunction with a toner donor member for touchdown development of an electrostatic image on a photoconductive recording drum.

In FIG. 2 representing a diagrammatic cross-sectional view of an automatic copying apparatus operating according to the present invention element 10 is a hopper containing triboelectrically chargeable toner particles 11 that enter a mixing zone 12 containing magnetic carrier particles (not shown in the drawing for clarity's sake). The toner particles 11 are regularly supplied into said zone with a dosing means, shown here as a rotating foam rubber dosing roller 13. The mixing of the toner particles with the carrier particles proceeds with a set of mixing blades 14 and 15 rotating in opposite directions. Adjacent the traylike mixing zone 12 is a rotatably driven aluminium sleeve 16 having inside permanent magnets 17, 18 and 19 in a holder 20 rotating in an opposite direction with respect to said sleeve. The thickness of the carrier-toner layer (filaments) swept along with the sleeve is controlled with an adjustable trailing doctor blade 21. The sleeve 16 carrying the carrier toner layer (not shown in the drawing) is rotating in an opposite direction with respect to a donor member in the form of belt 22 driven by driving rollers 23 and 24. The belt 22 is urged and pressed in the direction of a photoconductive recording drum 27 carrying an electrostatic charge image by the tensioning rollers 25 and 26. The thickness of the layer is in the range of 0.01 to 0.05 mm. The belt 22 is made of a resilient conductive rubber material having a surface resistivity of about $10^7$ ohms/square. The gap between the magnetic brush sleeve 16 and the belt 22 is in the range of 1 to 2 mm. Over said gap a voltage difference is maintained by a direct current voltage source optionally combined with an AC current voltage source the voltage peaks of which are of lower intensity than the voltage level of the DC voltage source (such sources being not shown in the drawing). The polarity of the electric field is such that toner particles by electrostatic attraction transfer from the sleeve 16 to the belt 22.

In FIG. 3 representing a diagrammatic cross-sectional view of an automatic copying apparatus for use according to the present invention element 30 represents a cylindrical toner donor member as described in FIG. 1 which replaces belt 22 in the previous embodiment. Said donor member 30 rotates in the indicated direction in close proximity to a non-magnetic aluminium sleeve 31 having inside permanent magnets 33, 34 and 35 arranged in a rotating holder 36.

The thickness of the toner-carrier layer carried along on the sleeve 31 is controlled with a bolt-fixed doctor blade 37. From the sleeve 31 the toner particles are selectively transferred by electrostatic attraction onto the donor member 30 the surface of which is kept to create such attraction at a correct potential difference with respect to the surface of said sleeve. The donor member 30 brings the thus obtained toner layer into touchdown contact with the image-wise charged surface of the photoconductive recording drum 38.

Residual carrier-toner developer is removed from sleeve 31 by the scraper blade 39 and re-introduced into the mixing tray 40. In the mixing tray 40 an oscillating paddle wheel 41 provides an intensive mixing of toner and carrier particles and thus a good triboelectric charging.

A steel drum 42 is kept at a biasing voltage with respect to the donor member 30 in order to create a toner attracting field effective to remove residual toner from the donor member, the removed toner being detached by the scraper blade 43 and re-introduced into the tray 40.

Fresh toner is introduced from a cylindrical replacable cartridge 44 having an axial opening 45 that before introduction is closed with a strippable tape. A rotating paddle wheel 46 introduces the toner gradually into the mixing tray 40.

Fresh carrier is added into the mixing tray through the opening 47 that is closable by an hinge-fixed cover lid 48.

In FIG. 4 representing a diagrammatic cross-sectional view of an automatic electronic imaging apparatus wherein electrostatic image formation proceeds simultaneously with development, element 50 represents a toner donor member in the form of an endless belt being a polyester film containing dispersed titanium dioxide as a substance having a high dielectric constant. Between the driving rollers 57 and 58 an array of styli electrodes 51 in a multi-stylus recording head 52 abuts, under the biasing force of spring tensioning means 56, against the inner surface of the belt 50. A signal recording power source 53 is connected to said array of styli 51 in order to selectively apply voltage pulses thereto responsive to image data. In operation the belt 50 makes contact with its outermost side with the dielectric layer side of dielectric-coated paper 54 that is conveyed with a grounded conductive conveyor roller 55. Opposite the recording head a tensioning roller 59 urges the belt 50 against a rotating sleeve 60 of hard conductive rubber. The sleeve 60 has inside a stationary permanent magnet cylinder 65 with alternating north (N) and south (S) poles. The sleeve 60 rotates in contact with a mixture 63 of magnetic carrier and non-magnetic toner particles supplied in a hopperlike tray 61. In contact with sleeve 60 a tension-controlled trailing doctor blade 62 defines the thickness of the applied carrier-toner mixture. Between the tensioning roller 59 and the magnetic cylinder 65, a direct current potential difference is maintained by the voltage source 64 in order to provide the necessary transfer bias for transfer of the toner particles onto the belt 50. In operation the rollers, belt, sleeve and dielectric-coated paper are driven in the directions indicated by the arrows. The developing bias obtained by the electrically activated styli induces a charge image on the dielectric layer of the paper that is simultaneously developed by the toner layer present on belt 50.

We claim:

1. A method for touchdown development of an electrostatic image present on a recording surface with dry toner particles, which comprises the following steps:
   (1) providing a mixture of magnetic carrier particles and separate triboelectrical chargeable toner particles that adhere electrostatically to said carrier particles, said carrier particles having a specific resistance higher than about $10^{12}$ ohm cm;
   (2) applying a layer of said mixture onto the surface of a rotating electrically conductive member while attracting said carrier particles to said electrically conductive member by magnetic force, said layer constituting a magnetic brush of magnetic carrier particles carrying electrostatically adhering toner particles;
   (3) selectively transferring by electrostatic attraction toner particles from said conductive member onto the surface of a separate donor member separated from the conductive member surface by an air gap by applying a DC voltage across said gap to create an electric field between the member surfaces, to thereby form a toner particle layer free of carrier particles on said donor member surface, said donor member surface having a surface resistivity not higher than $10^{13}$ ohm/square and such rotating conductive member comprises at least a surface layer directed towards the donor member of a material having a specific resistance lower than $10^2$ ohm.cm.; and
   (4) advancing said donor member surface with the transferred toner particle layer thereon to bring the toner layer into touchdown contact with said recording surface to develop thereon said electrostatic charge image, said donor member surface being so advanced with respect to said recording surface that there is no substantial relative movement between the donor member surface and said recording surface at the point of touchdown contact.

2. An image recording method according to claim 1 wherein the magnitude of said electric field between member surfaces is sufficiently strong to achieve a saturation loading of the donor member with toner particles.

3. An image recording method according to claim 1 wherein the electric field across said air gap is sufficiently strong to effect an overall jump-over of toner particles onto the donor member from the magnetic brush on said conductive member.

4. An image recording method according to claim 1, wherein the DC voltage is combined with an AC voltage of a lower peak value than the DC voltage level.

5. An image recording method according to claim 1, wherein said conductive member is a rotating sleeve having one or more optionally rotating magnets inside.

6. The method of claim 1, where said donor member comprises at least an exterior layer which is electrically conductive having a surface resistivity up to about 7 ohms.cm.

7. The method of claim 6, wherein said exterior layer of said donor member is conductive rubber.

8. An image recording method according to claim 1, wherein the material of the magnetic carrier particles whereto the toner particles adhere by triboelectric charging has a specific resistance higher than $10^{12}$ ohm.cm.

9. An image recording method according to claim 1, wherein the donor member is in the form of a rotating endless belt or rotating drum and contains at at least a surface layer of a material that triboelectrically charges with a charge of opposite charge sign with respect to the toner particles.

10. An image recording method according to claim 1, wherein the toner-developed element is a dielectric element having thereon an electrostatic charge pattern obtained by electrography.

11. An image recording method according to claim 1, wherein the toner-developed element is an electrostatic printing master comprising a surface member having a permanent or persistent image of insulating material on a grounded conductive backing, which member has been charged electrostatically to produce a latent image of electrostatic charges associated with an electrically conductive image background.

12. An image recording method according to claim 11, wherein the electrostatic printing master is a photopolymer master that has been imagewise exposed and imagewise charged in the exposed areas, whereupon these areas are toner developed and the obtained toner image is transferred to another surface.

13. An image recording method according to claim 12, wherein said master is made from a combination of polymeric binders, ethylenically unsaturated monomers, 2,4,5 triarylimidazolyl dimer polymerization initiators and chain transfer agents.

14. An image recording method according to claim 1, wherein the recording surface to be is a photoconductive dielectric element having formed thereon an electrostatic charge pattern obtained by electrophotography.

15. An image recording method according to claim 1, wherein the toner layer on the donor member has a thickness not greater than 50 micron and the toner layer thickness defines actually the gap, across which the touchdown contact and development takes place.

16. An image recording method according to claim 1, wherein the electrostatic charge image is formed on a dielectric coated paper with an image-wise modulated electric field using electrode styli and is simultaneously toner developed.

17. A method according to claim 1, wherein the recording surface to be toner developed and the donor member are in the form of drums that are rotating in an opposite sense at the same circumferential speed.

18. A method according to claim 1, wherein the toner donor member is in the form of an endless belt moving around driving and tensioning rollers to apply the toner layer by touchdown contact onto the recording surface to be toner developed.

19. A image method according to claim 1, wherein in addition to said conductive member supplying toner to the donor member a further conductive member is disposed adjacent said donor member to which a biasing voltage is applied with respect to said donor member to create a toner-attracting field to remove residual toner after touchdown development and the thus removed toner is remixed with carrier particles.

20. A method according to claim 1, wherein the toner particles are non-magnetic.

* * * * *